US008608389B2

(12) United States Patent
Tamura et al.

(10) Patent No.: US 8,608,389 B2
(45) Date of Patent: Dec. 17, 2013

(54) OPTICAL TRANSCEIVER WITH LENS ALIGNMENT FRAME

(75) Inventors: Kenichi Tamura, Hitachi (JP); Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 240 days.

(21) Appl. No.: 12/898,212

(22) Filed: Oct. 5, 2010

(65) Prior Publication Data

US 2011/0101255 A1  May 5, 2011

(30) Foreign Application Priority Data

Nov. 4, 2009  (JP) ................................ 2009-253328

(51) Int. Cl.
*G02B 27/00*  (2006.01)
*G02B 6/36*  (2006.01)

(52) U.S. Cl.
USPC ........................................... 385/92; 250/551

(58) Field of Classification Search
USPC .............. 250/551; 348/241, 246–247; 385/92
See application file for complete search history.

(56) References Cited

U.S. PATENT DOCUMENTS

| 5,233,248 A * | 8/1993 | Kawamura et al. ............. 310/88 |
| 6,213,651 B1 * | 4/2001 | Jiang et al. ....................... 385/92 |
| 2005/0168957 A1 * | 8/2005 | Kawauchi et al. ............ 361/749 |

FOREIGN PATENT DOCUMENTS

| JP | A-2003-295006 | 10/2003 |
| JP | 2005-084098 | 3/2005 |

OTHER PUBLICATIONS

Notification of Reason(s) for Refusal dated Dec. 18, 2012 received from the Japanese Patent Office from related Japanese Application No. 2009-253328, together with an English-language translation.

* cited by examiner

*Primary Examiner* — Thanh Luu
*Assistant Examiner* — Renee Naphas
(74) *Attorney, Agent, or Firm* — Scully, Scott, Murphy & Presser, PC

(57) ABSTRACT

An optical transceiver includes a transmitting side photoelectric converter, a transmitting side circuit board, a receiving side photoelectric converter, a receiving side circuit board, a surface of the transmitting side circuit board being arranged to face a surface of the receiving side circuit board, a lens block disposed between the transmitting side circuit board and the receiving side circuit board, and optically connected to a transmitting side optical fiber and a receiving side optical fiber, and a frame body holding the lens block such that the lens block aligns with the transmitting side photoelectric converter and the receiving side photoelectric converter, and to fix the transmitting side circuit board and the receiving side circuit board at a predetermined distance from each other.

11 Claims, 3 Drawing Sheets

| 2 TRANSMITTING SIDE PHOTOELECTRIC CONVERTER | 8 LENS BLOCK |
| 3 TRANSMITTING SIDE CIRCUIT BOARD | 9 LIGHT-EMITTING ELEMENT |
| 4 RECEIVING SIDE PHOTOELECTRIC CONVERTER | 19 LIGHT-RECEIVING ELEMENT |
| 5 RECEIVING SIDE CIRCUIT BOARD | 38 FRAME BODY |
| 6,7 OPTICAL FIBER | |

| | |
|---|---|
| 2 TRANSMITTING SIDE PHOTOELECTRIC CONVERTER | 8 LENS BLOCK |
| 3 TRANSMITTING SIDE CIRCUIT BOARD | 9 LIGHT-EMITTING ELEMENT |
| 4 RECEIVING SIDE PHOTOELECTRIC CONVERTER | 19 LIGHT-RECEIVING ELEMENT |
| 5 RECEIVING SIDE CIRCUIT BOARD | 38 FRAME BODY |
| 6,7 OPTICAL FIBER | |

| 8 OPTICAL BLOCK |
| 12 FIRST BASE MEMBER |
| 22 SECOND BASE MEMBER |
| 38 FRAME BODY |
| 41 ADHESIVE |

42,43 RIGID-FLEXIBLE PRINTED CIRCUIT BOARD
44,45 FLEXIBLE PORTION

OPTICAL TRANSCEIVER WITH LENS ALIGNMENT FRAME

The present application is based on Japanese Patent Application No. 2009-253328 filed on Nov. 4, 2009, the entire contents of which are incorporated herein by reference.

BACKGROUND OF THE INVENTION

1. Field of the Invention

The invention relates to an optical transceiver for reciprocally converting an electric signal and an optical signal.

2. Description of the Related Art

There is an optical transceiver for reciprocally converting an electric signal and an optical signal (e.g., an optical transceiver) in which a transmitting side circuit board mounting a transmitting side photoelectric converter including a light-emitting element and a receiving side circuit board mounting a receiving side photoelectric converter including a light-receiving element are arranged such that the surfaces mounting the respective photoelectric converters face each other (e.g., JP-A 2005-84098 and the specification of U.S. Pat. No. 6,213,651).

A common lens block is used on a transmitting side and on a receiving side for optically connecting the light-emitting element of the transmitting side photoelectric converter to a transmitting side optical fiber and the light-receiving element of the receiving side photoelectric converter to a receiving side optical fiber.

SUMMARY OF THE INVENTION

For the attachment of the lens block, it is necessary to be aligned with the light-emitting element of the transmitting side photoelectric converter and the light-receiving element of the receiving side photoelectric converter.

The specification of U.S. Pat. No. 6,213,651 shows that a light-emitting element and a light-receiving element packaged into TO-CAN are used, and that they are fixed to the lens block while being optically aligned with the lens block.

When a construction is used that a light-emitting element and a light-receiving element not packaged into TO-CAN are mounted on a transmitting side circuit board and a receiving side circuit board, respectively, it is desired that the lens block can be fixed relative to the transmitting side circuit board and the receiving side circuit board while being optically aligned with the light-emitting element and the light-receiving element.

Therefore, it is an object of the invention to provide an optical transceiver that a lens block thereof is fixed relative to a transmitting side circuit board and a receiving side circuit board while being optically aligned with the light-emitting element and the light-receiving element.

(1) According to one embodiment of the invention, an optical transceiver comprises:

a transmitting side photoelectric converter for converting an electric signal into an optical signal;

a transmitting side circuit board mounting the transmitting side photoelectric converter;

a receiving side photoelectric converter for converting an optical signal into an electric signal;

a receiving side circuit board mounting the receiving side photoelectric converter, a surface of the transmitting side circuit board mounting the transmitting side photoelectric converter being arranged to face a surface of the receiving side circuit board mounting the receiving side photoelectric converter;

a lens block disposed between the transmitting side circuit board and the receiving side circuit board, and optically connected to a transmitting side optical fiber and a receiving side optical fiber, for inputting an optical signal outputted from the transmitting side photoelectric converter into the transmitting side optical fiber and for inputting an optical signal outputted from the receiving side optical fiber into the receiving side photoelectric converter; and a frame body holding the lens block such that the lens block aligns with the transmitting side photoelectric converter and the receiving side photoelectric converter, and fixing the transmitting side circuit board and the receiving side circuit board at a predetermined distance from each other.

In the above embodiment (1) of the invention, the following modifications and changes can be made.

(i) The frame body is fixed to the transmitting side circuit board, the lens block is attached to the fixed frame body while aligning with the transmitting side photoelectric converter, and the receiving side circuit board is fixed to the frame body while aligning the attached lens block with the receiving side photoelectric converter.

(ii) The transmitting side circuit board comprises a first base member mounting the transmitting side photoelectric converter and a transmitting side printed-circuit board connected to the first base member, and the receiving side circuit board comprises a second base member mounting the receiving side photoelectric converter and a receiving side printed-circuit board connected to the second base member.

(iii) One or both of the transmitting side printed-circuit board and the receiving side printed-circuit board comprise a rigid-flexible printed circuit board, and the transmitting side printed-circuit board and the first base member, and/or, the receiving side printed-circuit board and the second base member are connected via a flexible portion of the rigid-flexible printed circuit board.

(iv) The frame body comprises a material having a linear expansion coefficient close to that of a material forming the first and second base members.

(v) The frame body covers side surfaces of the lens block except an optical fiber connecting surface that is connected to the transmitting side optical fiber and to the receiving side optical fiber.

(vi) The frame body comprises at a lower end and/or an upper end thereof a notch for diverting an electronic component or a wiring.

(vii) The frame body comprises a metal with shielding performance.

(viii) The frame body surrounds the transmitting side photoelectric converter and the receiving side photoelectric converter.

Points of the Invention

According to one embodiment of the invention, an optical transceiver is constructed such that a frame body is formed between a first base member and a second base member so as to surround a transmitting side photoelectric converter and a receiving side photoelectric converter, i.e., so as to cover the side surfaces of a lens block except its optical fiber connecting surface, the lens block is held, at the side surfaces, by being adhesively fixed to the frame body.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A preferred embodiment of the invention will be described below in conjunction with the appended drawings.

Figure 1:
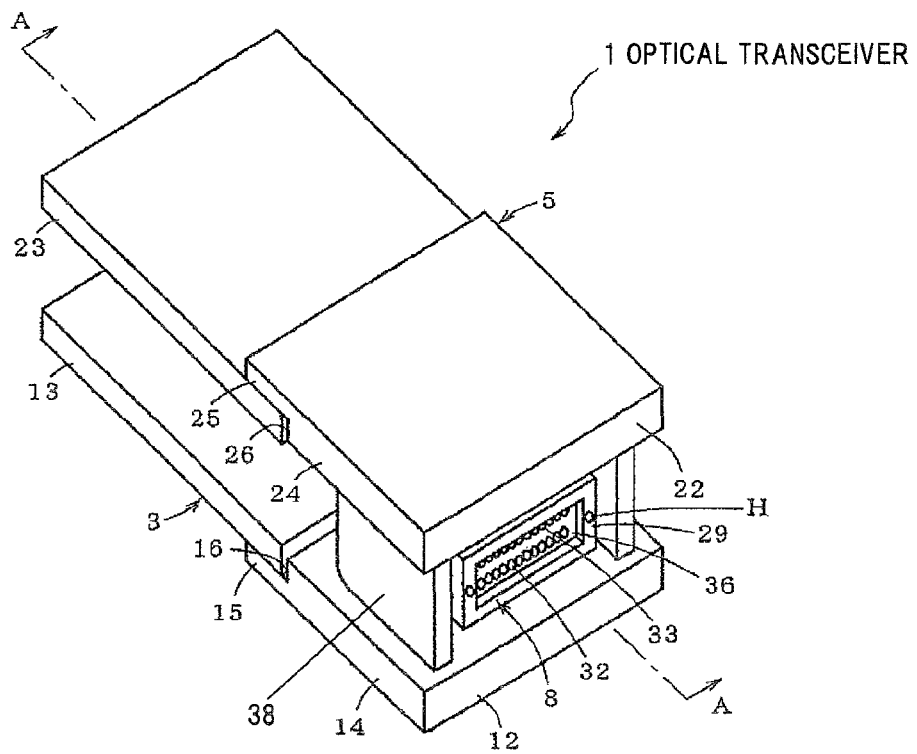
FIG. 1 is a perspective view showing an optical transceiver in an embodiment of the present invention.
Figure 2:
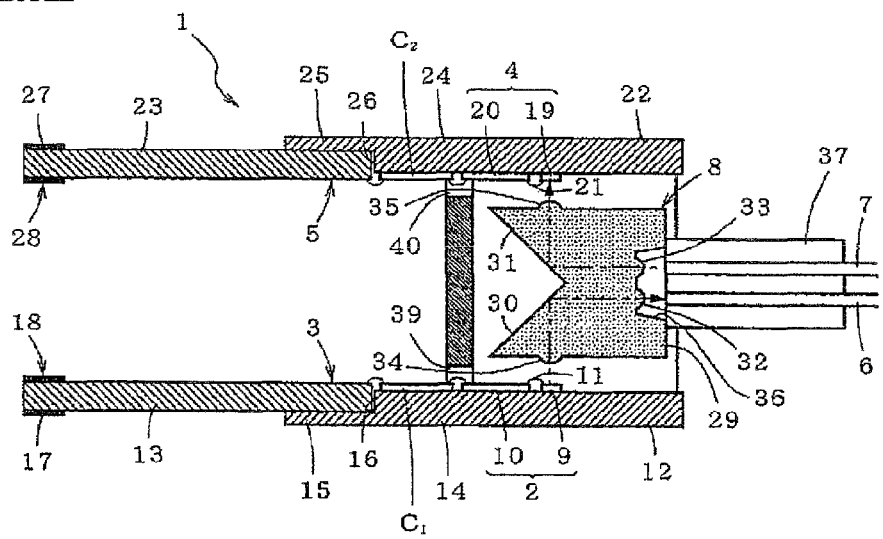
FIG. 2 is a cross sectional view taken along a line A-A in FIG. 1 showing the optical transceiver.
Figure 3:
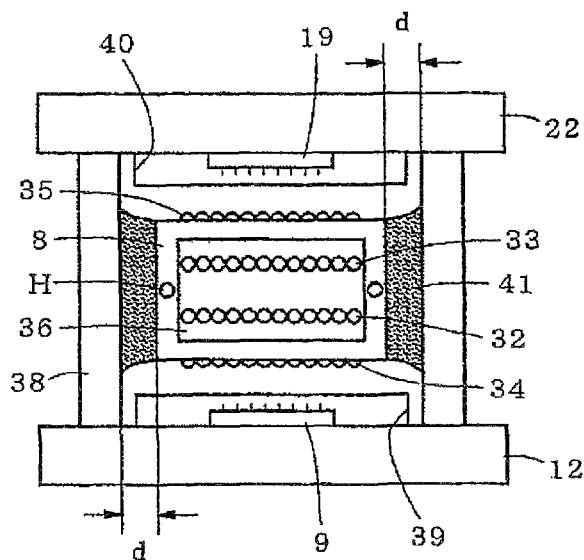
FIG. 3 is a view showing the optical transceiver of FIG. 1 as viewing from a lens block side.

FIG. 1 is a perspective view showing an optical transceiver of the present embodiment, FIG. 2 is a cross sectional view taken along the line A-A in FIG. 1 showing the optical transceiver and FIG. 3 is a view showing the optical transceiver of FIG. 1 as viewing from a lens block side.

In the present embodiment, a 24-channel optical transceiver (12 channels for transmitting and 12 channels for receiving) will be described as an example. The number of channels is not limited thereto, and there may be, e.g., 12 channels (6 channels for transmitting and 6 channels for receiving) or 4 channels (2 channels for transmitting and 2 channels for receiving).

As shown in FIGS. 1 and 2, an optical transceiver 1 of the present embodiment is provided with a transmitting side photoelectric converter 2 for converting an electric signal into an optical signal, a transmitting side circuit board 3 mounting the transmitting side photoelectric converter 2, a receiving side photoelectric converter 4 for converting an optical signal into an electric signal, a receiving side circuit board 5 mounting the receiving side photoelectric converter 4 and a non-illustrated housing for housing the above components inside thereof.

The transmitting side circuit board 3 and the receiving side circuit board 5 are arranged such that a surface of the transmitting side circuit board 3 on which the transmitting side photoelectric converter 2 is mounted faces a surface of the receiving side circuit board 5 on which the receiving side photoelectric converter 4 is mounted.

A lens block 8 is provided between the transmitting side circuit board 3 and the receiving side circuit board 5. The lens block 8 is optically connected to a transmitting side optical fiber 6 and a receiving side optical fiber 7. The lens block 8 outputs an optical signal from the transmitting side photoelectric converter 2 to the transmitting side optical fiber 6 as well as an optical signal from the receiving side optical fiber 7 to the receiving side photoelectric converter 4. The lens block 8 is made of glass (BK7, Pyrex (trademark) or quartz, etc.) or resin which is an optically transparent material.

The transmitting side photoelectric converter 2 is composed of a light-emitting element 9 and a driver IC (integrated circuit) 10 (LD (laser diode) driver) for drive control of the light-emitting element 9. The light-emitting element 9 is connected to the driver IC 10 by a bonding wire 11.

The light-emitting element 9 is formed of a single LD or LED (light emitting diode), or, a VCSEL in which plural light-emitting portions are arrayed in parallel. The light-emitting element 9 consists of a VCSEL in the present embodiment.

The transmitting side circuit board 3 is provided with a first base member 12 mounting the transmitting side photoelectric converter 2 and a transmitting side printed-circuit board 13 connected to the first base member 12. A rigid circuit board or a rigid-flexible circuit board can be used as the transmitting side printed-circuit board 13. A rigid circuit board is used as the transmitting side printed-circuit board 13 in the present embodiment.

The first base member 12 is composed of a plate-like base 14 and an extension portion 15 which is integrally formed with the base 14 and is thinner than the base 14. A rear surface of the first base member 12 (a surface opposite to the surface on which the transmitting side photoelectric converter 2 is mounted) is flat. A front surface of the first base member 12 (the surface on which the transmitting side photoelectric converter 2 is mounted) has a shape having a level difference 16 between the base 14 and the extension portion 15.

The first base member 12 is formed of a conductive member, e.g., metal such as copper-tungsten (Cu—W) or kovar. The back surface of the first base member 12 is in contact with the housing via a non-illustrated heat conductive sheet.

The transmitting side photoelectric converter 2 is mounted on the surface of the base 14 of the first base member 12. The surface of the extension portion 15 of the first base member 12 is adhesively fixed to the rear surface of the transmitting side printed-circuit board 13. The first base member 12 is electrically connected to a non-illustrated ground pattern formed on the transmitting side circuit board 3.

The driver IC 10 of the transmitting side photoelectric converter 2 is connected to a non-illustrated wiring pattern of the transmitting side printed-circuit board 13 via a first ceramic board $C_1$ for converting a wiring pitch.

The transmitting side printed-circuit board 13 is provided with a first card edge connector 18 consisting of a connecting terminal 17.

The receiving side photoelectric converter 4 is composed of a light-receiving element 19 and an amplifier IC (transimpedance amplifier: TIA) 20 for amplifying an electric signal from the light-receiving element 19. The light-receiving element 19 is connected to the amplifier IC 20 by a bonding wire 21.

The light-receiving element 19 is formed of a single PD (photodiode) or a PD array in which plural PDs are arrayed in parallel. The light-receiving element 19 consists of a PD array in the present embodiment.

The receiving side circuit board 5 is provided with a second base member 22 mounting the receiving side photoelectric converter 4 and a receiving side printed-circuit board 23 connected to the second base member 22. A rigid circuit board or a rigid-flexible circuit board can be used as the receiving side printed-circuit board 23. A rigid circuit board is used as the receiving side printed-circuit board 23 in the present embodiment.

The second base member 22 is composed of a plate-like base 24 and an extension portion 25 which is integrally formed with the base 24 and is thinner than the base 24. A rear surface of the second base member 22 (a surface opposite to the surface on which the receiving side photoelectric converter 4 is mounted) is flat. A front surface of the second base member 22 (the surface on which the receiving side photoelectric converter 4 is mounted) has a shape having a level difference 26 between the base 24 and the extension portion 25.

The second base member 22 is formed of a conductive member, e.g., metal such as copper-tungsten (Cu—W) or kovar.

The receiving side photoelectric converter 4 is mounted on the surface of the base 24 of the second base member 22. The surface of the extension portion 25 of the second base member 22 is adhesively fixed to the rear surface of the receiving side printed-circuit board 23. The second base member 22 is electrically connected to a non-illustrated ground pattern formed on the receiving side circuit board 5.

The amplifier IC 20 of the receiving side photoelectric converter 4 is connected to a non-illustrated wiring pattern of the receiving side printed-circuit board 23 via a second ceramic board $C_2$ for converting a wiring pitch.

The receiving side printed-circuit board 23 is provided with a second card edge connector 28 consisting of a connecting terminal 27.

The lens block 8 is provided between the transmitting side circuit board 3 and the receiving side circuit board 5, more specifically, between the first base member 12 and the second base member 22. The lens block 8 is formed of a rectangular parallelepiped block main body 29. The block main body 29 is provided with an optical fiber connecting surface which is connected to the transmitting side optical fiber 6 and the receiving side optical fiber 7. The lens block 8 is provided with a first reflective surface 30 and a second reflective surface 31 which are configured to form a V-shape on a surface of the block main body 29 opposite to the optical fiber connecting surface.

A first transmitting side lens 32 and a first receiving side lens 33 are formed on the optical fiber connecting surface of the block main body 29. In addition, a second transmitting side lens 34 is formed on a surface of the block main body 29 which faces the light-emitting element 9, and a second receiving side lens 35 is formed on a surface which faces the light-receiving element 19.

The first transmitting side lens 32 and the first receiving side lens 33 are formed so as to be each housed in a lens groove 36 which is formed on the optical fiber connecting surface of the block main body 29. The reason why the lenses 32 and 33 are formed so as to be housed in the lens groove 36 is to improve connectivity by flattening a connecting surface with a MT connector 37 which is described later.

The same number of the first and second transmitting side lenses 32 and 34 as the light-emitting portions of the VCSEL and the same numbers of the first and second receiving side lenses 33 and 35 as the PDs of the PD array are respectively formed in parallel (12 lenses each in the present embodiment).

The transmitting side optical fiber 6 and the receiving side optical fiber 7 are held, at edge faces thereof, by a MT (mechanically transferable) connector 37. The transmitting side optical fiber 6 and the receiving side optical fiber 7 each have 12 optical fibers. The MT connector 37 holds the transmitting side optical fiber 6 and the receiving side optical fiber 7 in parallel, one above the other. The transmitting side optical fiber 6 and the receiving side optical fiber 7 are connected to the optical fiber connecting surface of the block main body 29 by the MT connector 37. An alignment guide pin H is formed on the optical fiber connecting surface of the lens block 8 for aligning and connecting the MT connector 37 to the lens block 8. The MT connector 37 is provided with holes, and is fixed to the lens block 8 by inserting the guide pins H into the holes. Note that, the MT connector 37 is not shown in FIG. 1.

The optical transceiver 1 is provided with two-tiered card edge connectors 18 and 28, one is the first card edge connector 18 of the transmitting side printed-circuit board 13 and another is the second card edge connector 28 of the receiving side printed-circuit board 23.

The card edge connectors 18 and 28 located on one edge of the optical transceiver 1 are inserted into an edge connector socket of a connection destination device, thereby electrically connecting the optical transceiver 1. Although the case of arranging the transmitting side circuit board 3 on the lower side and the receiving side circuit board 5 on the upper side has been described in the present embodiment, the arrangement may be upside down.

In the optical transceiver 1, the electric signal from the device is input to the transmitting side circuit board 3 via the first card edge connector 18 and is converted into the optical signal at the light-emitting element 9 of the transmitting side photoelectric converter 2, and the optical signal is output in a direction perpendicular to the board surface. The optical signal is reflected at the first reflective surface 30 of the lens block 8, thereby changing the optical axis at 90°, and is output to the transmitting side optical fiber 6. Meanwhile, the optical signal output from the receiving side optical fiber 7 is reflected at the second reflective surface 31 of the lens block 8, thereby changing the optical axis at 90°, and is incident on the light-receiving element 19 of the receiving side photoelectric converter 4. The light-receiving element 19 converts the optical signal into the electric signal which is output to the connection destination device via the second card edge connector 28 of the receiving side circuit board 5.

The optical transceiver 1 of the present embodiment has a frame body 38 for holding the lens block 8 in the state that the lens block 8 is aligned with each of the transmitting side photoelectric converter 2 and the receiving side photoelectric converter 4 and fixing the transmitting side circuit board 3 and the receiving side circuit board 5 at a predetermined distance from each other.

The frame body 38 is formed between the first base member 12 and the second base member 22 so as to surround the transmitting side photoelectric converter 2 and the receiving side photoelectric converter 4, i.e., so as to cover the side surfaces of the block main body 29 except the optical fiber connecting surface. The frame body 38 is bonded and fixed to the respective base members 12 and 22 by a thermosetting resin such as epoxy resin or by YAG welding.

In addition, notches 39 and 40 for diverting various electronic components or wirings (bonding wire, etc.) are formed at portions of lower and upper sides of the frame body 38.

The frame body 38 is formed of a material having a linear expansion coefficient close to that of a material forming the first base member 12 and the second base member 22, e.g., Cu—W or kovar. An SUS-based material may be used. As a result, the deterioration in alignment accuracy of the lens block 8 with the respective photoelectric converters 2 and 4, which is caused by separation of the frame body 38 holding the lens block 8 from the respective base members 12 and 22 or misalignment of the fixed position of the frame body 38 due to heat generated in the driver IC 10 or the amplifier IC 20 during the operation of the optical transceiver 1 or a change in ambient temperature, can be prevented.

The frame body 38 should be formed of metal with shielding performance. This suppresses leakage of electromagnetic wave to the outside from the driver IC 10 of the transmitting side photoelectric converter 2 and the amplifier IC 20 of the receiving side photoelectric converter 4, and it is thereby possible to improve EMI characteristics.

As shown in FIG. 3, the lens block 8 is held, at the side surfaces thereof, by being adhesively fixed to the frame body 38. An adhesive 41 used for fixing the lens block 8 to the frame body 38 is, e.g., UV curing resin. A distance d between the lens block 8 and the frame body 38 is about 300 μm, which is such a distance that the adhesive 41 does not drip.

A method of assembling the optical transceiver 1 will be described below.

Figure 4:
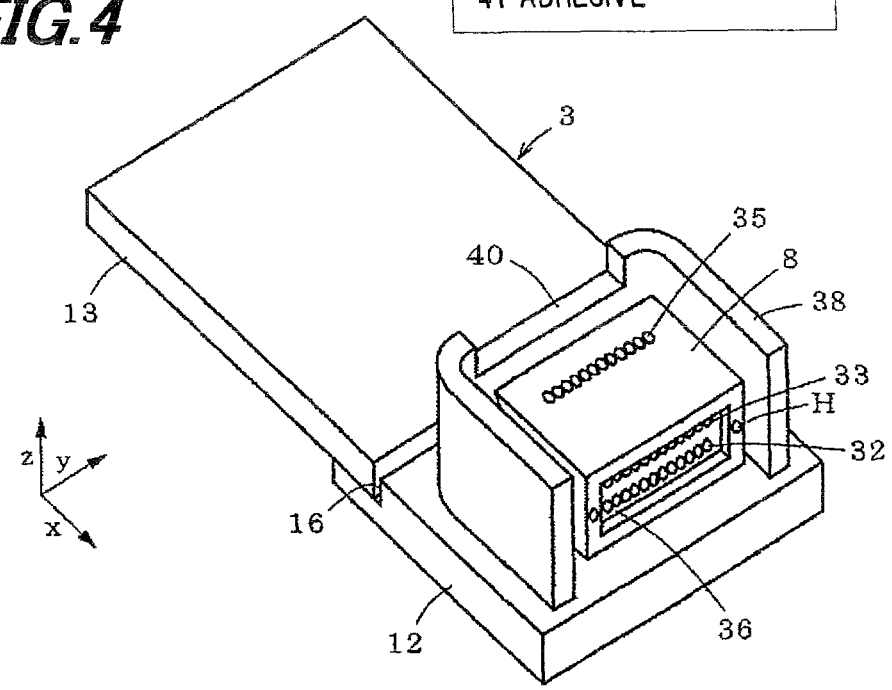
FIG. 4 is a view for explaining a method of assembling the optical transceiver of FIG. 1.

As shown in FIG. 4, the frame body 38 is arranged so as to surround the transmitting side photoelectric converter 2 mounted on the first base member 12, and is bonded and fixed to the surface of the first base member 12 by the UV curing resin or by the YAG welding.

Then, the lens block 8 is placed inside the frame body 38, and is moved in an x, y or z direction or is rotated around an x, y or z axis to be aligned with the light-emitting element 9. In detail, when, for example, the light-emitting element 9 is a VCSEL, there is an alignment method in which the light-emitting portions arranged at the both ends of the VSCEL are aligned with the first and second transmitting side lenses 32 and 34 which are arranged at the both ends of the lens block 8. In this case, an optical power meter is connected to the transmitting side optical fiber 6 and the position of the lens block 8 is adjusted so that the power detected by the optical power meter is the strongest. The alignment is performed, e.g., at an accuracy of about ±1 μm.

After the alignment of the lens block 8 with the light-emitting element 9, the adhesive 41 is applied to the side surfaces of the lens block 8 and is cured while maintaining the alignment of the lens block 8 and the light-emitting element 9. As a result, the lens block 8 is aligned and held in the frame body 38.

After that, the upper portion of the frame body 38 is arranged so as to surround the receiving side photoelectric converter 4 mounted on the second base member 22, and is bonded and fixed to the surface of the second base member 22 by the UV curing resin. At this time, the lens block 8 is fixed while performing the alignment with the light-receiving element 19 by moving the second base member 22 in the x or y direction or rotating around the z axis. In detail, when, for example, the light-receiving element 19 is a PD array, there is an alignment method in which the PDs arranged at the both ends of the PD array are aligned with the second receiving side lenses 35 arranged at the both ends of the lens block 8. In this case, while measuring electric current passing through the PD, the position of the lens block 8 is adjusted so that the current from the PDs arranged on the both ends is detected at the maximum. The alignment is performed, e.g., at an accuracy of about ±1 μm.

As described above, the frame body 38 is bonded to the transmitting side circuit board 3 and the lens block 8 is held in the frame body 38 while being aligned with the light-emitting element 9, and subsequently, the receiving side circuit board 5 is bonded to the upper portion of the frame body 38 while the lens block 8 is aligned with the light-receiving element 19, and the optical transceiver 1 is thereby assembled.

The reason why the frame body 38 is initially arranged on the transmitting side circuit board 3 and the lens block 8 is then aligned with the light-emitting element 9 is that more accuracy is required for the alignment with the light-emitting element 9 than that with the light-receiving element 19. Particularly, this is because the distance in the z direction from the second transmitting side lens 34 to the light-emitting element 9 is important while the distance in the z direction from the second receiving side lens 35 to the light-receiving element 19 is not as important as for the light-emitting element 9.

The following assembly procedures may be adopted instead of the above assembly sequence. Firstly, the lens block 8 is adhesively fixed to the frame body 38 while the position is adjusted by using a jig, etc. At that time, UV curing resin or heat curing adhesive is used. Next, the frame body 38 is YAG welded or adhesively fixed to the base member 12 in the state that the lens block 8 is aligned with the light-emitting element 9. Then, the base member 22 is YAG welded or adhesively fixed to the frame body 38 which is fixed to the base member 12 in the state that the lens block 8 is aligned with the light-receiving element 19. In the above-mentioned procedure, since the lens block 8 is adhesively fixed to the frame body 38 before the frame body 38 is fixed to the base members 12 and 22, the lens block 8 can be adhesively fixed to the frame body 38 using the heat curing adhesive. As described above, since it is possible to fix the lens block 8 to the frame body 38 using the heat curing adhesive which imparts stronger adhesiveness than the UV curing adhesive, it is possible to improve strength of the optical transceiver 1.

The above means that, in the optical transceiver 1 of the present embodiment, the lens block 8 is held in a state of being aligned with each of the transmitting side photoelectric converter 2 and the receiving side photoelectric converter 4, and the frame body 38 is provided in order to fix the transmitting side circuit board 3 and the receiving side circuit board 5 at a predetermined distance from each other.

Therefore, it is possible to realize the optical transceiver 1 having a structure for attaching the lens block 8 which allows the accurate alignment with the transmitting side photoelectric converter 2 and the receiving side photoelectric converter 4 according to the variation of each component due to the manufacturing error, as well as allows easy attachment.

Figure 5:
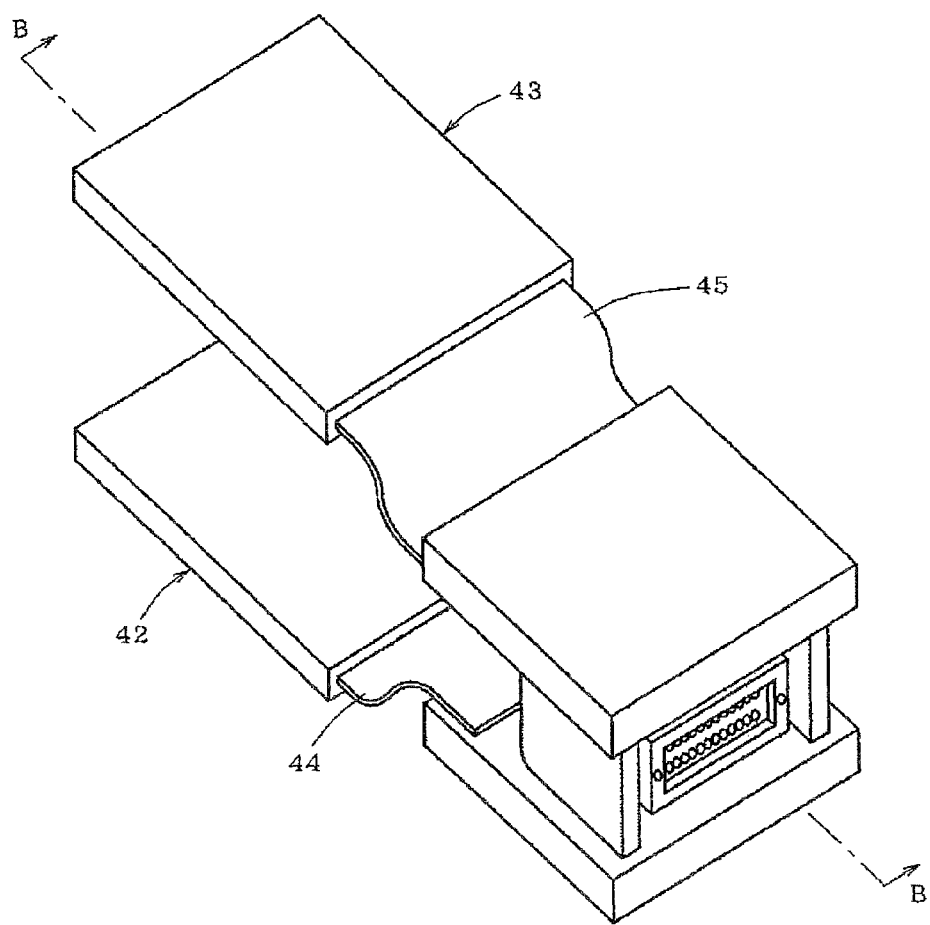
FIG. 5 is a perspective view showing a modification of the invention.
Figure 6:
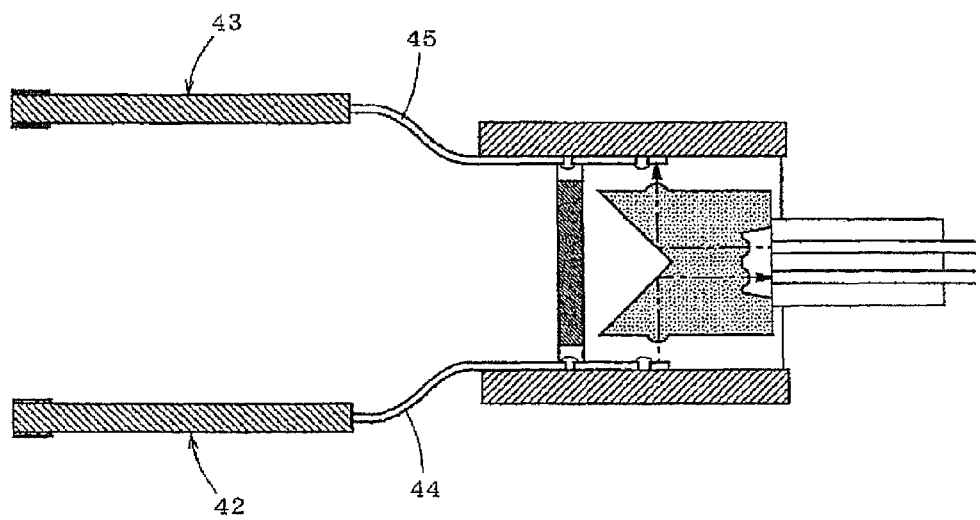
FIG. 6 is a cross sectional view cut along a line B-B of FIG. 5.

Although the transmitting side printed-circuit board 13 and the receiving side printed-circuit board 23 consists of a rigid circuit board in the present embodiment, one or both of the transmitting side printed-circuit board 13 and the receiving side printed-circuit board 23 (both of them in FIGS. 5 and 6) may consist of rigid-flexible printed circuit boards 42 and 43 so as to be connected to the first and second base members 12 and 22 by flexible portions 44 and 45 thereof as shown in FIGS. 5 and 6.

In this case, since the wiring pitch can be converted by the flexible portions 44 and 45 instead of by the first and second ceramic boards $C_1$ and $C_2$ used for converting a wiring pitch, it is possible to reduce the component count.

In the case where the respective base members 12 and 22 are rigidly fixed to the respective printed-circuit boards 13 and 23, if the respective base members 12 and 22 are misaligned due to the alignment of the lens block 8 with the respective optical elements 9 and 19, the respective printed-circuit boards 13 and 23 having the card edge connectors 18 and 28 respectively formed thereon are also misaligned. In this case, when attempting to arrange the respective edge connectors 18 and 28 at the standardized positions, stress is applied to each of the printed-circuit boards 13 and 23.

In contrast, when the transmitting side printed-circuit board 13 and the receiving side printed-circuit board 23 consist of the rigid-flexible printed circuit boards 42 and 43, the stress can be relieved by the flexible portions 44 and 45, and thus, it is possible to arrange the respective edge connectors 18 and 28 to the standardized positions without applying the stress to the transmitting side printed-circuit board 13 and the receiving side printed-circuit board 23.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. An optical transceiver, comprising:
   a transmitting side photoelectric converter configured to convert an electric signal into an optical signal;

a transmitting side circuit board configured to mount the transmitting side photoelectric converter;

a receiving side photoelectric converter configured to convert an optical signal into an electric signal;

a receiving side circuit board configured to mount the receiving side photoelectric converter, a surface of the transmitting side circuit board mounting the transmitting side photoelectric converter being arranged to face a surface of the receiving side circuit board mounting the receiving side photoelectric converter;

a lens block disposed between the transmitting side circuit board and the receiving side circuit board, the lens block having first and second side surfaces optically connected to a transmitting side optical fiber and a receiving side optical fiber respectively, the lens block being configured to input an optical signal outputted from the transmitting side photoelectric converter into the transmitting side optical fiber and to input an optical signal outputted from the receiving side optical fiber into the receiving side photoelectric converter; and a frame body configured to hold the lens block such that the lens block aligns with the transmitting side photoelectric converter and the receiving side photoelectric converter, the frame body being further configured to fix the transmitting side circuit board and the receiving side circuit board at a predetermined distance from each other, wherein the frame body covers third and fourth side surfaces of the lens block and does not cover the first and second side surfaces of the lens block, wherein the third and fourth side surfaces of the lens block are fixed to the frame body by an adhesive, wherein the frame body surrounds the transmitting side photoelectric converter and the receiving side photoelectric converter.

2. The optical transceiver according to claim 1, wherein the frame body is fixed to the transmitting side circuit board, the lens block is attached to the fixed frame body while aligning with the transmitting side photoelectric converter, and the receiving side circuit board is fixed to the frame body while aligning the attached lens block with the receiving side photoelectric converter.

3. The optical transceiver according to claim 1, wherein the transmitting side circuit board comprises a first base member mounting the transmitting side photoelectric converter and a transmitting side printed-circuit board connected to the first base member, and the receiving side circuit board comprises a second base member mounting the receiving side photoelectric converter and a receiving side printed-circuit board connected to the second base member.

4. The optical transceiver according to claim 3, wherein one or both of the transmitting side printed-circuit board and the receiving side printed-circuit board comprise a rigid-flexible printed circuit board, and the transmitting side printed-circuit board and the first base member, and/or, the receiving side printed-circuit board and the second base member are connected via a flexible portion of the rigid-flexible printed circuit board.

5. The optical transceiver according to claim 3, wherein the frame body comprises a material having a linear expansion coefficient close to that of a material forming the first and second base members, such that the alignment of the lens block with the transmitting side photoelectric converter and the receiving side photoelectric converter is substantially maintained when heat is generated.

6. The optical transceiver according to claim 3, wherein the first base member comprises a base and an extension portion which is integrally formed with the base, a rear surface of the first base member is flat and a front surface of the first base member has a shape having a level difference between the base and the extension portion, and wherein the second base member comprises a base and an extension portion which is integrally formed with the base, a rear surface of the second base member is flat and a front surface of the second base member has a shape having a level difference between the base and the extension portion.

7. The optical transceiver according to claim 6, wherein the surface of the extension portion of the first base member is fixed to the rear surface of the transmitting side printed-circuit board, and wherein the surface of the extension portion of the second base member is fixed to the rear surface of the receiving side printed-circuit board.

8. The optical transceiver according to claim 3, wherein the first base member or the second base member is formed of a metal and is in contact with a housing via a heat conductive sheet.

9. The optical transceiver according to claim 1, wherein the frame body comprises at a lower end and/or an upper end thereof a notch for diverting an electronic component or a wiring.

10. The optical transceiver according to claim 1, wherein the frame body comprises a metal with shielding performance.

11. The optical transceiver according to claim 1, wherein a distance between the lens block and the frame body is such a distance that the adhesive does not drip.

\* \* \* \* \*